US006571101B1

(12) United States Patent
Schulz

(10) Patent No.: US 6,571,101 B1
(45) Date of Patent: May 27, 2003

(54) METHOD AND RADIO COMMUNICATIONS SYSTEM FOR CONTROLLING SIGNALING

(75) Inventor: Egon Schulz, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/421,054

(22) Filed: Oct. 19, 1999

(30) Foreign Application Priority Data

Oct. 19, 1998 (DE) .......................................... 198 48 116

(51) Int. Cl.[7] .................................................. H04Q 7/20
(52) U.S. Cl. ........................................ 455/450; 455/452
(58) Field of Search ................................ 455/450, 452, 455/453, 509, 515; 370/335, 337, 342, 348

(56) References Cited

U.S. PATENT DOCUMENTS

| 5,251,249 A | * 10/1993 | Allen et al. .................. 455/443 |
| 5,638,412 A | 6/1997 | Blakeney, II et al. |
| 5,657,358 A | 8/1997 | Panech et al. |
| 6,081,536 A | * 6/2000 | Gorsuch et al. ............. 370/335 |
| 6,137,787 A | * 10/2000 | Chawla et al. ............... 370/337 |
| 6,192,248 B1 | * 2/2001 | Solondz ....................... 455/450 |
| 6,240,079 B1 | * 5/2001 | Hamalainen et al. ........ 370/337 |
| 6,292,664 B1 | * 9/2001 | Ostrup et al. ................ 455/450 |
| 6,295,453 B1 | * 9/2001 | Desgagne et al. ........... 370/342 |

OTHER PUBLICATIONS

"Aufbau and Organisation des GSM–Systems" in "Mobilfunk und intelligente Netze" [Mobile Radio and Intelligent Networks] (J. Biala), Vieweg Verlag, 1995, pp. 57–92.

* cited by examiner

Primary Examiner—Nay Maung
(74) Attorney, Agent, or Firm—Laurence A. Greenberg; Werner H. Stemer; Ralph E. Locher

(57) ABSTRACT

Signals of a service are transmitted in a radio communications system in a common signaling channel from a plurality of radio stations to a base station. Service classes are assigned to specific services. The base station selects possible service classes for further processing in dependence on an instantaneous traffic volume in the common signaling channel and signals them to the radio stations in a further signaling channel. The radio stations take into account the selected service channels for access to the common signaling channel.

23 Claims, 4 Drawing Sheets

METHOD AND RADIO COMMUNICATIONS SYSTEM FOR CONTROLLING SIGNALING

BACKGROUND OF THE INVENTION

Field of the Invention

The invention lies in the telecommunications field. More specifically, the invention relates to a method and a radio communications system for controlling signaling, in particular in a mobile radio system.

In radio communications systems, useful data, for example voice, image information or other data are transmitted between a transmitting radio station and a receiving radio station via a radio interface using electromagnetic waves. The electromagnetic waves are thereby broadcast with carrier frequencies which lie in the frequency band that is provided for the respective system. In the conventional GSM mobile radio system (Global System for Mobile Communications), as is known, inter alia, from J. Biala, "Mobilfunk und intelligente Netze" [Mobile Radio and Intelligent Networks], Vieweg Verlag, 1995, in particular pages 57–92, the carrier frequencies are in the range of 900 MHz, 1800 MHz and 1900 MHz. Future radio communications systems, for example the UMTS (Universal Mobile Telecommunications System) or other third generation systems, frequencies in the approximately 2000 MHz frequency band are provided. In order to distinguish between different signaling sources at the location of the respective receiver it is possible to use frequency multiplex (FDMA= frequency division multiple access), time-division multiplex (TDMA=time division multiple access), and/or code multiplex methods (CDMA=code division multiple access), as well as a combination of these known methods.

The above-mentioned Biala description (see page 78) discloses a GSM mobile radio system wherein a mobile station uses, for a connection set-up, a common access signaling channel RACH (Random Access (Control) Channel) for requesting a transmitting channel at a base station. In order to prevent blocking when there is simultaneous access of a plurality of mobile stations to the signaling channel, the access takes place according to a method with random access timing, a so-called slotted Aloha protocol. As a confirmation in response to the connection request, the base station directly assigns a transmission channel on a confirmation signaling channel (AGCH) (Access Grant Channel), or provides a reference to a specific signaling channel SDCCH (Stand-Alone Dedicated Channel) for the further standard connection set-up procedure.

In addition to the use for a connection set-up, the access signaling channel RACH is used for further services such as connection management (CM) and mobility management (MM).

The connection management service carries out, inter alia, functions such as call control, supplementary service signaling or even short message signaling. On the other hand, the mobility management service covers all the tasks which arise from the mobility of the mobile stations. It includes, inter alia, the localization and updating of the positions of the mobile stations.

In future third generation radio communications systems, a common use of, for example, the access signaling channel for a plurality of different services is planned in order to utilize more effectively the capacity of the radio resources.

SUMMARY OF THE INVENTION

It is accordingly an object of the invention to provide a method and a base station for a communications system, which overcomes the above-mentioned disadvantages of the heretofore-known devices and methods of this general type and which prevents blocking of the signaling channel which is used jointly for a plurality of services.

With the foregoing and other objects in view there is provided, in accordance with the invention, a method of controlling signaling in a radio communications system, which comprises:

transmitting signals of a service in a common signaling channel in an up-link direction from a plurality of radio stations to a base station of a radio communications system;

transmitting signals in a further signaling channel in a down-link direction from the base station to the radio stations;

assigning service classes to the services;

selecting, with the base station, possible service classes for further processing, depending on a function of a traffic volume currently determined in the common signaling channel;

signaling, with the base station, the selected service classes to the radio stations in the further signaling channel; and taking into account, with the radio stations, the selected service classes for access to the common signaling channel.

In other words, the signals of a service are transmitted in a common signaling channel in the up-link direction from the radio stations to the base station of the radio communications system. In the other direction, the signals are transmitted in a further signaling channel in the down-link direction from the base station to the radio stations. Service classes are assigned to the services so as to characterize them. The base station selects possible service classes for further processing, as a function of a traffic volume which is instantaneously determined in the common signaling channel, and signals them to the radio stations in the further signaling channel. In response, the radio stations take into account the selected service classes for access to the common signaling channel.

The invention has the advantage that by virtue of the assignment of the services to service classes in the base station it is possible to select which services are, for example, available to the radio stations at any time and which services are, for example, not further processed when there is a high traffic volume in the common signaling channel. As a result, overloading or blocking of the common signaling channel owing to a high signaling load is advantageously prevented.

This has a particularly advantageous effect if, according to further developments, signals of services relating to connection management, mobility management and/or transmission of packet data are transmitted by the radio stations. In this context, it is possible, for example, to assign the services of the connection management and mobility management, which are highly significant for a safeguarded connection and a constant high transmission quality in a radio communications system which is embodied as a mobile radio system, a higher priority than the transmission of packet data, so that when the traffic volume is high the connection management and mobility management service classes are selected and signaled to the radio stations. In the same way, it is possible to restrict the connection management service if, for example, all the transmission channels are assigned and it is not possible to set up any further communications connections via the base station. The respectively selected service classes can be taken into account in the radio stations in such a way that the radio stations only ever transmit signals of the selected services to the base station.

In accordance with an added feature of the invention, a first service class is assigned to a service relating to connection management, a second service class is assigned to a service relating to mobility management, and a third service class is assigned to a service relating to a packet data transmission.

In accordance with an additional feature of the invention, the selected service classes are each characterized by an information element in a signaling message in the further signaling channel. The signaling message according to the invention makes it advantageously possible for the radio stations to transmit signals of services in accordance with the service classes which have been selected by the set information elements.

In accordance with another feature of the invention, an instantaneous traffic volume in the common signaling channel is determined in the base station or in a device for assigning radio resources of the radio communications system.

In accordance with a further development of the invention, the instantaneous traffic volume is determined periodically at predefined time intervals and/or when the instantaneous traffic volume changes. This makes it advantageously possible for the signaling of the selected services to be adapted to the respective instantaneous change in the traffic volume, the radio stations being at all times informed of which services they can access. Furthermore, by means of an optimized time interval it is possible advantageously to minimize the signaling load without negative effects in terms of capacity utilization of the common signaling channel occurring.

In accordance with two alternative developments of the invention on the first hand the instantaneous traffic volume of the respective service classes is compared with a threshold value for a maximum traffic volume. When the threshold value is exceeded the respective service class is not selected for further processing. On the other hand, the traffic volume in the signaling channel is compared with at least one threshold value for a maximum traffic volume. If the threshold value is respectively exceeded a specific service class is not selected for further processing.

The first alternative development makes it advantageously possible for an appropriate transmission capacity to be assured for the corresponding service classes in the common signaling channel at any time by virtue of the comparison of each service class with a threshold value. In this context, it is also conceivable that, for example, only the traffic volume for the service of the transmission of data packets is compared with the threshold value. If this threshold value is exceeded, it is signaled to the radio stations that only the further services which are still selected can be accessed. An exemplary restriction of the transmission of data packets is not critical owing to the transmission which is not dependent on real time, because the transmission of the data packet can be reset by the radio station until sufficient transmission capacity is available again in the common signaling channel.

The second alternative development has the advantage that only the entire traffic volume in the signaling channel is determined and in each case the service classes which are necessary for optimum operation of the radio communications system are selected in each case as a function of said traffic volume. Thus, for example when there is a high traffic volume, firstly the transmission of packet data, and subsequently the mobility management, are restricted in order to ensure at least a safeguarded connection set-up and release. On the other hand, it is possible, for example, to restrict the connection management if all of the transmission channels which are available to the base station are being used. The respective threshold values can be set here by, for example, the network operator, because he has considerable interest in a continuously high transmission quality and connection reliability.

In accordance with again an added feature of the invention, the common signaling channel used is an access signaling channel which is accessed by the radio stations according to a randomly controlled slotted ALOHA method. This access signaling channel can be based, for example, on the access signaling channel which is known from the GSM mobile radio system and whose function has been described above in the introduction to the description.

In accordance with again an additional feature of the invention, the further signaling channel used is a common signaling channel in which general system information of the radio communications system is transmitted, or a connection-specific confirmation signaling channel is used. The common signaling channel is monitored by all the radio stations which are located in the radio coverage area of the base station, and the system information of said channel is read out and evaluated. The connection-specific confirmation signaling channel has the advantage that the selected service classes are signaled in each case only to the radio stations which access the common signaling channel, as a result of which the general signaling load in the radio communications system is advantageously reduced.

The further signaling channel can be based on the Broadcast Control Channel (BCCH) known from the GSM mobile radio system, or on the Access Grant Channel (AGCH), such as were described in the introduction to the description and which are supplemented in each case with additional signaling information. This refinement of the signaling channels on the basis of known signaling channels has the advantage that compatibility between, for example, second and third generation mobile radio systems is made possible, in which case the additional information is, for example, not recognized or taken into account by the older system.

With the above and other objects in view there is also provided, in accordance with the invention, a radio communications system for controlling signaling, which comprises:

a base station;

a plurality of radio stations each having a control device and having a transceiver device for transmitting respective signals of a service in a common signaling channel in an up-link direction to the base station;

the base station having a transceiver device for transmitting signals in a further signaling channel in a downlink direction to the radio stations;

a control device in the base station for selecting possible service classes assigned to the services, for further processing as a function of an instantaneous traffic volume in the common signaling channel, and for making available the selection for the transceiver device for signaling the selected service channels in the further signaling channel; and the respective control device in the radio stations taking into account the selected service classes for access to the common signaling channel.

In accordance with yet an added feature of the invention, a device is provided in the base station for determining the instantaneous traffic volume in the common signaling channel or a respective instantaneous traffic volume of the service classes.

In accordance with yet an additional feature of the invention, a radio resource assignment device connected to the base station for assigning radio resources, the radio resource assignment device having a device for determining one of the instantaneous traffic volume in the common signaling channel and the respective instantaneous traffic volume of the service classes.

In accordance with yet another feature of the invention, an evaluation device is provided in the base station for comparing the instantaneous traffic volume with a threshold value.

In accordance with a concomitant feature of the invention, a timer in the base station initiates a determination of the instantaneous traffic volume in the common signaling channel at specific time intervals.

It is thus clear that the method according to the invention is particularly advantageously used in a radio communications system which uses a CDMA subscriber separation method or a combination of a CDMA method with further subscriber separation methods. A parallel use of a frequency band for a plurality of communications connections is common to these methods, the individual connections being differentiated by individual spread codes. As a result, in comparison with the known GSM mobile radio system, a relatively large number of radio stations can access the common signaling channel in parallel, and correspondingly cause this channel to be overloaded.

Other features which are considered as characteristic for the invention are set forth in the appended claims.

Although the invention is illustrated and described herein as embodied in a method and radio communications system for controlling signaling, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
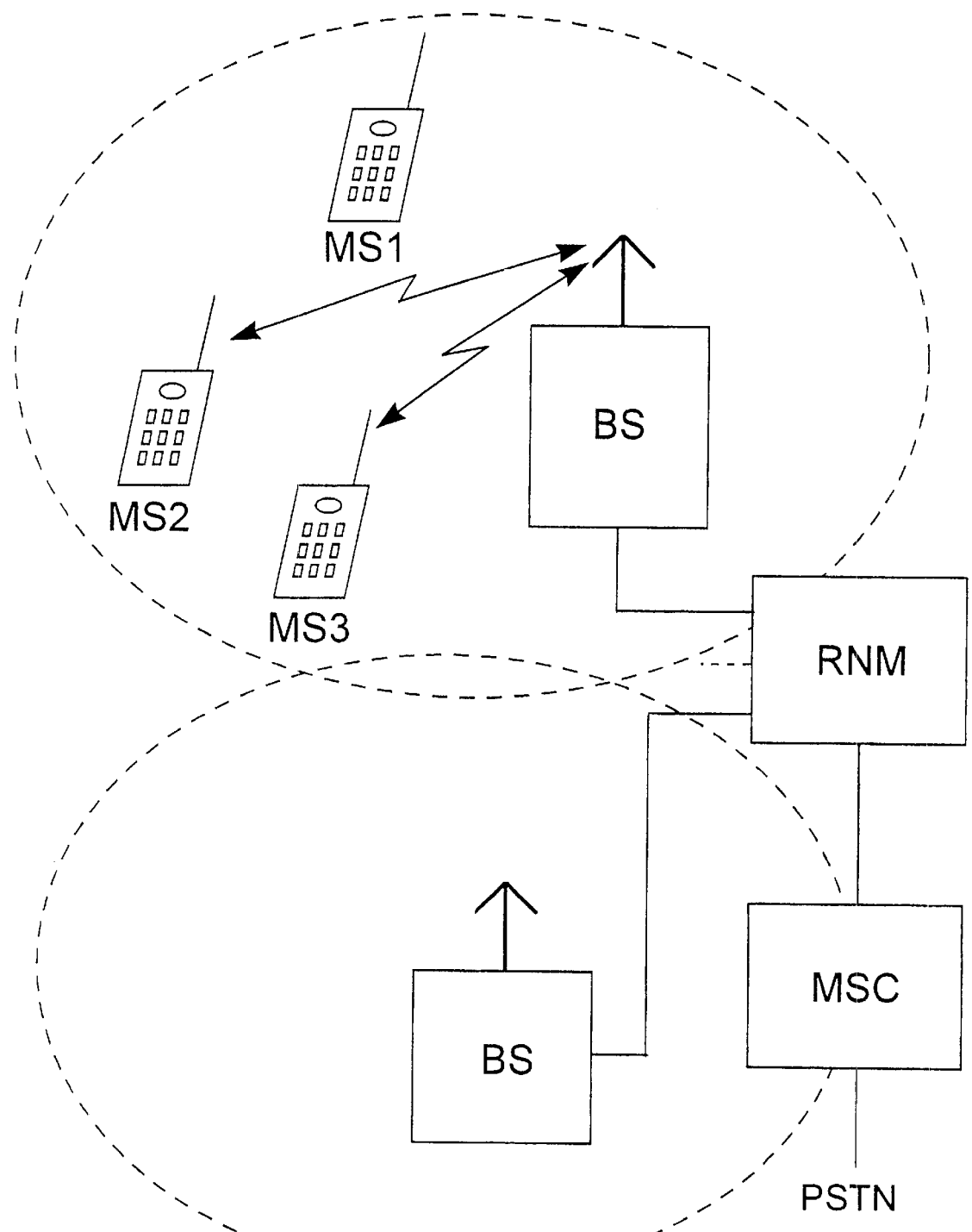
FIG. 1 is a block diagram of a radio communications system, in particular of a mobile radio system.

Referring now to the figures of the drawing in detail and first, particularly, to FIG. 1 thereof, there is seen a radio communications system that is embodied, by way of example, as a mobile radio system. In its structure, the communications system corresponds to a conventional GSM mobile radio system which is composed of a plurality of mobile switching centers MSC, which are networked to one another or provide access to a fixed network PSTN. In addition, these mobile switching centers MSC are each connected to at least one device for assigning radio resources RNM. Each of these devices RNM makes possible in turn a connection to at least one base station BS. The base station BS is a radio station which, via an interface, can set up and release communications connections to radio stations MS1, MS2, ..., which may be embodied as mobile stations. The functionality of the structure is used by the method according to the invention.

Two communications connections are shown in FIG. 1, by way of example, for transmitting user data and signaling information between the radio stations MS2, MS3 and a base station BS. In addition, there is a further radio station MS1 in the radio coverage area of the base station BS which has still not set up any communications connection in the case illustrated.

To illuminate a radio coverage area, the base station BS has at least one antenna device which is composed of, for example, three individual radiators. The radiation of each of the individual radiators is directed into a sector of the radio coverage area which is being covered. However, as an alternative a relatively large number of individual radiators (as in adaptive antennas) can be used, so that a spatial separation of subscribers according to a SDMA method (space division multiple access) is also made possible.

Figure 2:
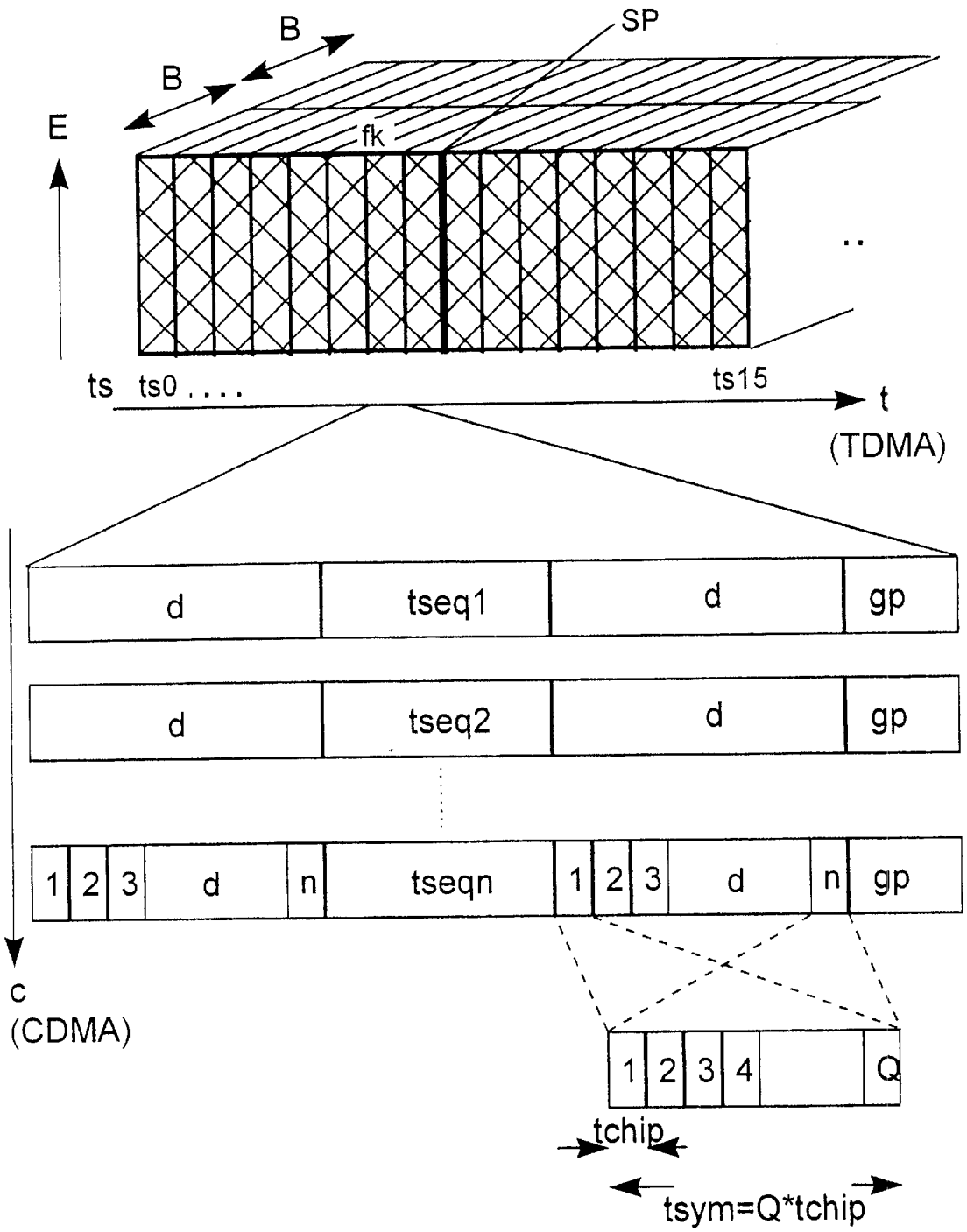
FIG. 2 is a schematic diagram of the frame structure of the radio interface and of the structure of a radio block.

Referring now to FIG. 2, there is shown an exemplary frame structure of the radio interface. According to a TDMA component, there is provision for a broadband frequency band, for example with the bandwidth B=5 MHz, to be divided into a plurality of time slots, for example 16 time slots ts0 to ts15. Each time slot ts within the frequency band B forms a frequency channel fk. Within a broadband frequency band B, the successive time slots ts are structured according to a frame structure so that 16 time slots ts0 to ts15 are combined to form one frame.

When a TDD transmission method is used, some of the time slots ts1 to ts15 are used in the up-link direction and some of the time slots ts0 to ts15 are used in the down-link direction, in which case the transmission in the up-link direction takes place, for example, before the transmission in the down-link direction. Between them there is a changeover time SP, which can be flexibly positioned according to the respective requirement for transmission channels for the up-link and down-link directions. A frequency channel fk for the up-link direction corresponds in this case to the frequency channel fk for the down-link direction. The further frequency channels fk are structured in the same way.

Within the frequency channels fk, information from a plurality of connections is transmitted in radio blocks. These radio blocks are composed of sections with data d, in which in each case sections with training sequences tseq1 to tseqn, which are known at the receiver end, are embedded. The data d are spread in a connection-specific way with a fine structure, a spread code c (CDMA code), so that at the receiver end it is possible, for example, to separate n connections by means of this CDMA component. The combination of a frequency channel fk and a spread code c defines a transmission channel which is used for the transmission of signaling information and user information.

The spread of individual symbols of the data d with Q chips has the effect that within the symbol period tsym Q subsections of the period tchip are transmitted. The Q chips form the individual CDMA code c here. Furthermore, a protective guard time gp for compensating different signal propagation times of the connections of successive time slots ts are provided within the time slot ts.

One application of the method according to the invention is also possible, for example, for a TDMA subscriber separation method, known from the GSM mobile radio system, or for a CDMA subscriber separation method, in which case in the CDMA method a transmission channel is defined merely by a frequency band B and a CDMA code, and user information and signaling information is continuously transmitted in the transmission channels.

Figure 3:
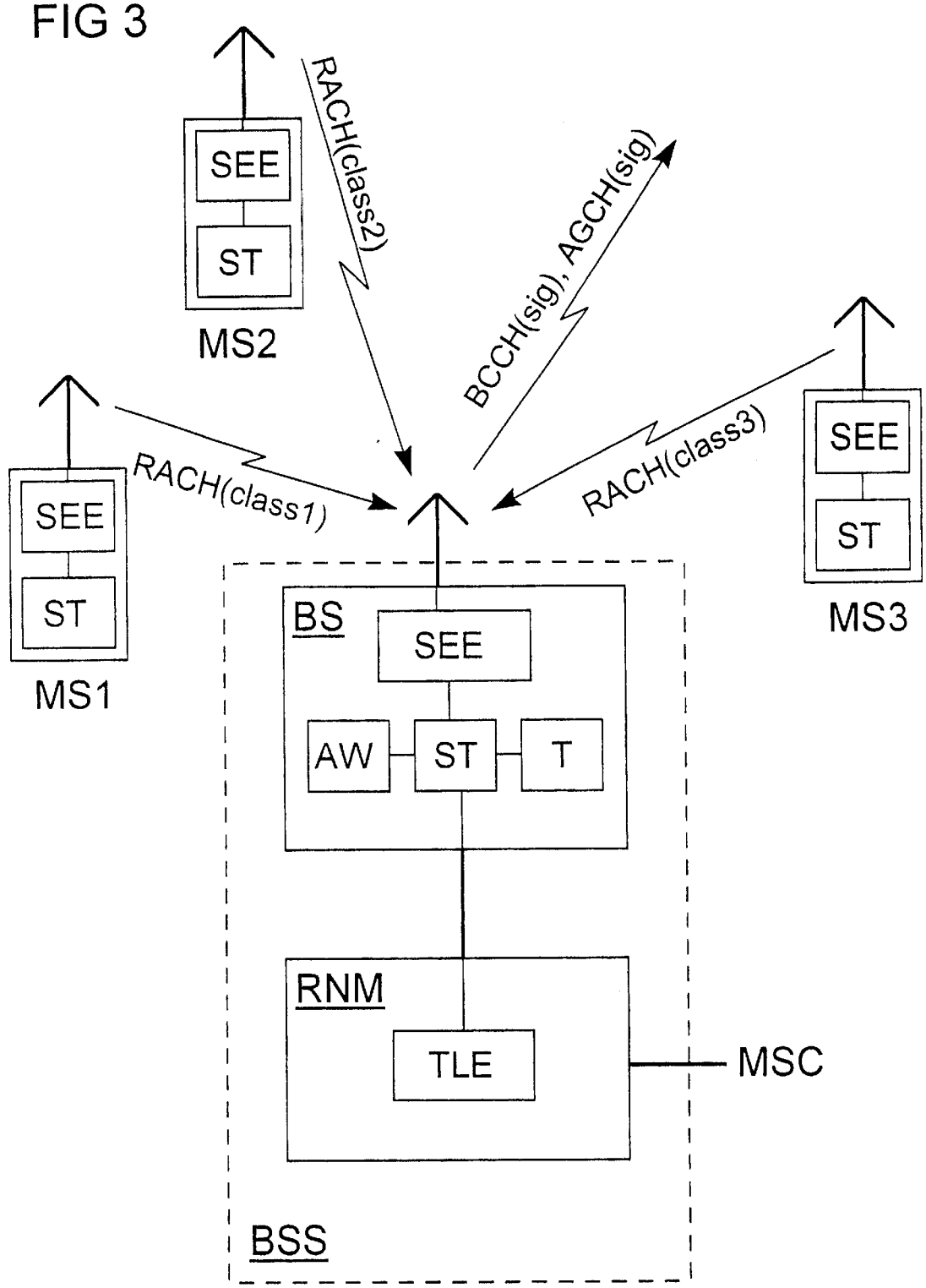
FIG. 3 is a block diagram of a base station system with devices according to the invention.

The block diagram illustrated in FIG. 3 is based on the mobile radio system in FIG. 1. By way of example, signals are being transmitted between a base station BS of a base station system BSS, which has not only the base station BS but also a device RNM for assigning radio resources as well as three radio stations MS1, MS2 and MS3, which are located within the radio coverage area of the base station BS. The radio stations MS2 and MS3 already have communications connections via the base station BS in accordance with FIG. 1, while the further radio station MS1 has not yet set up any communications connection. FIG. 3 illustrates only a transmission of signals in signaling channels, so that, for example, the base station BS periodically transmits a common signaling channel BCCH in the down-link direction, which channel contains general system information on the mobile radio system and is transmitted in parallel by all the base stations BS. On the other hand, the radio stations MS1, MS2 and MS3 transmit, for example, signals on an access signaling channel RACH to the base station BS, the signals being assigned to different service classes class1, class2 and class3. The access signaling channel RACH can correspond here in its basic structure to the Random Access Channel RACH known from the GSM mobile radio system, the channel being used by the radio stations MS1, MS2 and MS3 for a freely selectable multiple access according to the principle of the slotted Aloha method. When a radio interface structure, such as is illustrated in FIG. 2, is used, it is possible to distinguish between a plurality of radio stations which access the access signaling channel RACH, for example by means of a freely selectable use of eight orthogonal codes.

The signals of the services which are transmitted, by way of example, in the access signaling channel RACH are assigned to service classes class1, class2 and class3 in such a way that the service class class1 corresponds to, for example, the service of a connection management, for example connection set-up and release, the service class class2 corresponds to the service of a mobility management, for example localization and position updating of the radio station, and the service class class3 corresponds to the service of a transmission of packet data. It is possible, as respective confirmation of a signaling operation by a radio station, for the base station to assign directly, for example in accordance with the GSM mobile radio system on a confirmation signaling channel AGCH (Access Grant Channel), a transmission channel or a reference to a specific signaling channel SDCCH (Stand-Alone Dedicated Channel) for the further standard connection set-up procedure. The connection control and mobility management functions are processed, for example, in accordance with the GSM mobile radio system exclusively between the mobile stations and the mobile switching centers in logical channels of the layer 3 of the standardized signaling protocol architecture.

The mobility management, connection management and radio resource control are corresponding subordinate layers of the layer 3. The connection control is further subdivided into the three protocol instances Call Control (CC), Supplementary Services (SS) signaling and Short Message Services (SMS) signaling. The radio resource control performs the function of frequency and channel administration for setting up, releasing and maintaining communications connections between a mobile station and the mobile radio network. Moreover, the radio resource control is also responsible, inter alia, for monitoring the Broadcast Control Channels (BCCH) if no communications connection is established. The mobility management comprises all the functions which result from the mobility of the mobile station. They include, inter alia, the localization and updating of the position of the mobile station. In the connection management system, the call control performs all the functions within the scope of setting up, operating and releasing calls.

A connection set-up attempt of the further radio station MS1 by means of a signaling operation according to the service class class1 takes place, for example, in the manner known from the GSM mobile radio system such that the further radio station MS1 monitors the common signaling channel BCCH and initiates a connection set-up to the base station BS whose common signaling channel BCCH it receives with the maximum reception strength. This is usually the base station BS in whose radio coverage area the further function MS1 is located at that particular time. According to the radio interface structure illustrated in FIG. 2, the common signaling channel BCCH can be transmitted by the base stations BS in the first time slot ts0, for example, in which case the possibility of distinguishing between the different base stations BS by means of a different training sequence tseq is ensured.

The situation illustrated in FIG. 3 corresponds to the radio stations MS1, MS2 and MS3 accessing the access signaling channel RACH, signals being transmitted according to different service classes class1, class2 and class3 in each case. The radio station MS3 transmits user data information in the form of data packets according to the service class class3, the radio station MS2 signals, for example, position updating according to the service class class2 and the further radio station MS1 requests, for example, a connection set-up according to the service class class1.

In order to transmit and receive the user information and signaling information in transmission channels and signaling channels, the base station BS and the radio stations MS1, MS2, MS3 each have a transceiver device SEE. The base station BS and the device RNM for assigning radio resources also have an evaluation device AW according to the invention, a control device ST and a timer T, or a device TLE for determining the traffic volume. The radio stations MS1, MS2, MS3 have, in addition to the transceiver device SEE, a control device ST. In addition to these illustrated devices which are relevant to the invention and are described in the following description relating to FIG. 4, further known devices are implemented in the components of the base station system BSS and in the radio stations MS1, MS2, MS3.

Figure 4:
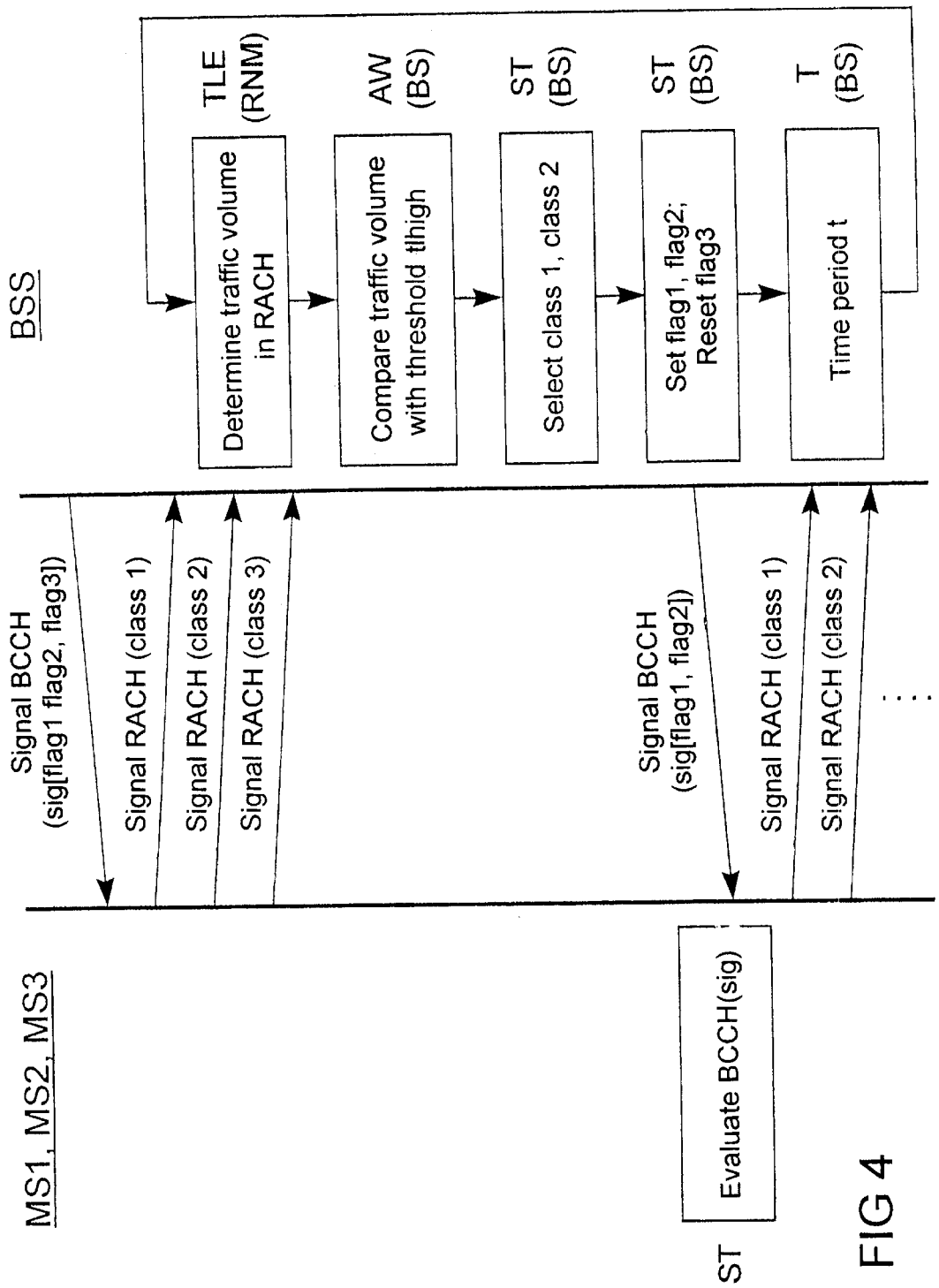
FIG. 4 is a signaling diagram of the method according to the invention.

FIG. 4 illustrates a signaling diagram for an exemplary implementation of the method according to the invention. The left-hand side shows method steps for the radio stations MS1, MS2, MS2 and the right-hand side shows method steps for the base station system BSS. The device, and in brackets the component, in which the respective method step is carried out is shown to the side of the method steps. The signaling via the radio interface between the radio stations MS1, MS2, MS3 and the base station system BSS is illustrated in the center.

In terms of the situation illustrated in FIG. 3, the base station BS transmits general system information on the radio communications system in the common signaling channel BCCH. The system information contains an additional signaling message sig according to the invention, in which it is signaled to the receiving radio stations MS1, MS2 and MS3 that the service classes class1, class2 and class3 can at that given time be further processed at the network end on the access signaling channel RACH. The selection of the supported service channels class1, class2 and class3 can be made, for example, by means of a respective information element flag1, flag2 or flag3. The information elements flag1, flag2, flag3 can consist, for example of one octet each. Depending on the service classes class1, class2, class3 selected at that particular time, the respective information elements flag1, flag2, and flag3 are entered in the signaling message sig.

The radio stations MS1, MS2 and MS3 subsequently transmit signals according to different service classes class1, class2 or class3 to the base station BS on the access signaling channel RACH in accordance with the description of FIG. 3. The signals are received in the transceiver device SEE in the base station BS and fed for further processing at the network end. In the device TLE for determining the traffic volume in the device RNM for assigning radio resources, the instantaneous traffic volume in the access signaling channel RACH is determined and signaled to the control device ST in the base station BS. The determination is initiated, for example, by a timer T at predefined time intervals t or when the traffic volume changes. The timer T is implemented here, as specified in FIG. 3 in the base station BS. It would also be conceivable to arrange the timer T more centrally, for example in the device RNM. The time interval t can be varied, for example, by the operator of the radio communications system in a central operations and maintenance center. It is also conceivable to implement the device TLE so as to determine the traffic volume in the base station BS, for example.

In an evaluation device AW connected to the control device ST, the traffic volume which is determined is compared with at least one threshold value tlhigh. This comparison can be made in different ways. Thus on the one hand, it is possible to make a comparison in each case between a traffic volume caused by a service class class1, class2 or class3 and a respective threshold value tlhigh, in which case a respective traffic volume is determined by the device tle for determining the traffic volume for each service class class1, class2 or class3. On the other hand, it is conceivable to compare the entire traffic volume determined with a plurality of threshold values tlhigh, in which case when a threshold value tlhigh is respectively exceeded an information element of the respective service class class1, class2 or class3 is removed from the signaling message sig. In the same way, it is, for example, also possible to compare just the traffic volume of the service class class3, that is to say the transmission of packet data, with a threshold value tlhigh. As a result of the respective comparison, corresponding service classes, in the example in FIG. 4 the service classes class1 and class2, are selected in the control device ST, and the corresponding information elements flag1 and flag2 are left in the signaling message sig, or the information element flag3 for the service class class3 is removed from the information message sig.

On the common signaling channel BCCH, it is subsequently signaled to the radio stations MS1, MS2 and MS3 by the information elements flag1, flag2 entered in the signaling message sig, that at that particular time only the service classes class1 and class2 are being further processed at the network end. The contents of the common signaling channel BCCH are subsequently evaluated in the control devices ST of the radio station MS1, MS2 and MS3, and an appropriate adaptation relating to the transmission of signals in the access signaling channel RACH is carried out.

In the example illustrated in FIG. 3 and FIG. 4, the signaling in the common signaling channel BCCH signifies that the radio station MS2 can continue to signal localization updating, and the further radio station MS1 can signal a connection set-up. On the other hand, owing to the information element flag3 which is no longer transmitted, the radio station MS3 cannot send any further data packets according to the service class class3 to the base station BS until the information element flag3 is inserted into the signaling message sig again.

In the same way, in the event of a further rise in the traffic volume, the information element flag2 for the service class class2 can also be removed. The decision as to which service class is respectively transmitted in which situation can be defined, for example, by the network operator by setting the respective threshold values tlhigh, in which case, however, the services which are vital to the functioning of a mobile radio system, such as connection management and mobility management should have priority over the transmission of data packets. This can also be adapted in favor, for example, of an increased, usable transmission capacity for the transmission of data packets in special cases for example, such as when there are locally limited facilities which are covered by just one base station BS and for which there is therefore virtually no signaling for mobility management. A special case is, for example, also the complete coverage of all the transmission channels of the base station BS. In this case, the connection management can also be disabled in favor of the transmission of packet data because it is not possible to set up any new connections.

The signaling of the respectively selected service classes class1, class2, class3 by the base station BS can, in one refinement of the invention, also be carried out in a point-to-point signaling channel such as the aforementioned confirmation signaling channel AGCH, in contrast with the point-to-multipoint signaling channel BCCH specified in the example. Here, it is possible to assign the respective radio stations MS1, MS2 and MS3 a transmission permit for the service classes class1, class2, class3 by transmitting the corresponding information elements, or transmission can be prevented by removing information elements.

I claim:

1. A method of controlling signaling in a radio communications system, which comprises;

transmitting signals of a service in a common signaling channel in an up-link direction from a plurality of radio stations to a base station of a radio communications system;

transmitting signals in a further signaling channel in a down-link direction from the base station to the radio stations; assigning service classes to the services;

selecting, with the base station, possible service classes for further processing, depending on a function of a traffic volume currently determined in the common signaling channel;

signaling, with the base station, the selected possible service classes for further processing in the further signaling channel; and taking into account, with the radio stations, the signaled possible service classes for further processing for their access to the common signaling channel in order to request a desired service.

2. The method according to claim 1, which comprises assigning a first service class to a service relating to connection management.

3. The method according to claim 2, which comprises assigning a second service class to a service relating to mobility management.

4. The method according to claim 3, which comprises assigning a third service class to a service relating to a packet data transmission.

5. The method according to claim 1, which comprises characterizing the selected service classes by an information element in a signaling message in the further signaling channel.

6. The method according to claim 1, which comprises determining an instantaneous traffic volume in the common signaling channel in the base station or in a device for assigning radio resources of the radio communications system.

7. The method according to claim 1, which comprises determining an instantaneous traffic volume in the common signaling channel periodically at predefined time intervals.

8. The method according to claim 1, which comprises determining an instantaneous traffic volume in the common signaling channel when the traffic volume changes.

9. The method according to claim 1, which comprises determining an instantaneous traffic volume in the common signaling channel periodically at predefined time intervals and whenever the traffic volume changes.

10. The method according to claim 1, which comprises comparing the instantaneous traffic volume of the respective service classes with a threshold value for a maximum traffic volume and, if the threshold value is exceeded, avoiding to select the respective service class for further processing.

11. The method according to claim 1, which comprises comparing the instantaneous traffic volume in the common signaling channel with at least one threshold value for a maximum traffic volume and, if the respective threshold value is exceeded, avoiding to select a specific service class for further processing.

12. The method according to claim 1, wherein the common signaling channel is an access signaling channel, and the method comprises accessing the access signaling channel by the radio stations according to a randomly-controlled slotted ALOHA method.

13. The method according to claim 1, wherein the further signaling channel is a common signaling channel, and the method further comprises transmitting general system information of the radio communications system in the common signaling channel.

14. The method according to claim 1, wherein the further signaling channel is a connection-specific confirmation signaling channel, and the method further comprises transmitting connection-specific confirmation signals of the radio communications system in the further signaling channel.

15. The method according to claim 1, which comprises separating subscribers in accordance with a CDMA method for transmitting signals via a radio interface of the radio communications system, and defining a physical transmission channel for the common signaling channel and for the further signaling channel by means of a frequency band and a spread code.

16. The method according to claim 1, which comprises separating subscribers in accordance with a TDMA method, and defining a physical transmission channel for the common signaling channel and for the further signaling channel by means of a frequency band and a time slot.

17. The method according to claim 1, which comprises transmitting signals in accordance with a TDD method, and transmitting the signals chronologically separated in one frequency band from the radio stations to the base station in an up-link direction, and from the base station to the radio stations in a down-link direction.

18. A radio communications system for controlling signaling, which comprises:

a base station;

a plurality of radio stations each having a control device and having a transceiver device for transmitting respective signals of a service in a common signaling channel in an up-link direction to said base station;

said base station having a transceiver device for transmitting signals in a further signaling channel in a down-link direction to said radio stations;

a control device in said base station for selecting possible service classes assigned to the services, for further processing as a function of an instantaneous traffic volume in the common signaling channel, and for making available the selection for the transceiver device for signaling the selected possible service classes for further processing in the further signaling channel; and said respective control device in said radio stations taking into account the signaled possible service classes for further processing for their access to the common signaling channel in order to request a desired service.

19. The radio communications system according to claim 18, which further comprises a device in said base station for determining one of the instantaneous traffic volume in the common signaling channel and a respective instantaneous traffic volume of the service classes.

20. The radio communications system according to claim 18, which comprises a radio resource assignment device connected to said base station for assigning radio resources, said radio resource assignment device having a device for determining one of the instantaneous traffic volume in the common signaling channel and the respective instantaneous traffic volume of the service classes.

21. The radio communications system according to claim 20, which comprises an evaluation device in said base station for comparing the instantaneous traffic volume with a threshold value.

22. The radio communications system according to claim 19, which comprises an evaluation device in said base station for comparing the instantaneous traffic volume with a threshold value.

23. The radio communications system according to claim 18, which comprises a timer in said base station for initiating a determination of the instantaneous traffic volume in the common signaling channel at specific time intervals.

* * * * *